United States Patent
Van Bommel et al.

(10) Patent No.: US 11,356,645 B2
(45) Date of Patent: Jun. 7, 2022

(54) ENHANCED WHITE LIGHT FOR PROJECTION LIGHTING

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/756,466

(22) PCT Filed: Oct. 18, 2018

(86) PCT No.: PCT/EP2018/078494
§ 371 (c)(1),
(2) Date: Apr. 15, 2020

(87) PCT Pub. No.: WO2019/077020
PCT Pub. Date: Apr. 25, 2019

(65) Prior Publication Data
US 2021/0195148 A1 Jun. 24, 2021

(30) Foreign Application Priority Data
Oct. 19, 2017 (EP) .................................... 17197353

(51) Int. Cl.
*G03B 21/20* (2006.01)
*H04N 9/31* (2006.01)
(Continued)

(52) U.S. Cl.
CPC ......... *H04N 9/3155* (2013.01); *G02B 26/008* (2013.01); *G03B 21/2013* (2013.01); *G03B 21/2033* (2013.01); *G03B 33/16* (2013.01); *H04N 9/3158* (2013.01); *H04N 9/3161* (2013.01); *H04N 9/3164* (2013.01)

(58) Field of Classification Search
CPC .. H04N 9/3155; H04N 9/3158; H04N 9/3161; H04N 9/3164; G03B 21/2013;
(Continued)

(56) References Cited

U.S. PATENT DOCUMENTS 5,967,636 A 10/1999 Stark et al.
2008/0143970 A1 6/2008 Harbers et al.
(Continued)

FOREIGN PATENT DOCUMENTS

CN 1402082 A 3/2003
CN 1482487 A 3/2004
(Continued)

*Primary Examiner* — Ryan D Howard
(74) *Attorney, Agent, or Firm* — Daniel J. Piotrowski

(57) ABSTRACT

The invention provides a full color projection system (1000) comprising a lighting system (100) configured to provide first light (111) including blue light, second light (121) including one or more of green and yellow light, third light (131) including red light, wherein the first light (111), the second light (121), and the third light (131) include light having a wavelength of 430 nm or larger; a further light source (140) configured to provide further light source light (141) including one or more of UV light and short wavelength blue light having a wavelength of 420 nm or smaller, wherein the first light (111), second light (121), third light (131) and the further light source light (141) have mutually differing spectral power distributions; a spatial light modulator system (200) configured to receive the first light (111), the second light (121), the third light (131), and the further light source light (141), wherein the spatial light modulator system (200) is configured to provide a plurality of pixels (210) for providing projection system light (1001) with one or more of the first light (111), the second light (121), and the third light (131), and in one or more control modes the further light source light (141); and a control system (300) configured to control the lighting system (100), the further
(Continued)

light source (140), and the spatial light modulator system (200), wherein during operation one or more pixels (210) are temporarily configured to provide white projection system light (1001), and wherein the projection system (1000) is configured to provide also the further light source light (141) via one or more of those one or more pixels (210).

15 Claims, 9 Drawing Sheets

(51) Int. Cl.
*G02B 26/00* (2006.01)
*G03B 33/16* (2006.01)

(58) Field of Classification Search
CPC ............ G03B 21/2026; G03B 21/2033; G03B 21/204; G03B 21/2053
See application file for complete search history.

(56) References Cited

U.S. PATENT DOCUMENTS

| | | |
|---|---|---|
| 2009/0091717 A1 | 4/2009 | Ogino |
| 2009/0091718 A1 | 4/2009 | Obi et al. |
| 2009/0219488 A1* | 9/2009 | Dufour .................. G09G 3/002 353/20 |
| 2015/0049459 A1 | 2/2015 | Peeters et al. |
| 2016/0161067 A1 | 6/2016 | Oepts et al. |
| 2017/0111972 A1 | 4/2017 | Oepts et al. |

FOREIGN PATENT DOCUMENTS

| | | |
|---|---|---|
| CN | 101405651 A | 4/2009 |
| CN | 102902144 A | 1/2013 |
| CN | 103019018 B | 9/2015 |
| DE | 102016111731 B3 | 7/2017 |
| EP | 2182721 A2 | 5/2010 |
| JP | 2005-017985 A | 1/2005 |
| JP | 2010-079156 A | 4/2010 |
| JP | 2010-140017 A | 6/2010 |
| JP | 2010-191135 A | 9/2010 |
| JP | 2010191135 A | 9/2010 |
| JP | 6095335 B2 | 3/2017 |
| WO | 2006054203 A1 | 5/2006 |
| WO | 2007/108387 A1 | 9/2007 |
| WO | 2009069010 A1 | 6/2009 |
| WO | 2017021087 A1 | 2/2017 |
| WO | 2017071954 A1 | 5/2017 |

* cited by examiner

ENHANCED WHITE LIGHT FOR PROJECTION LIGHTING

CROSS-REFERENCE TO PRIOR APPLICATIONS

This application is the U.S. National Phase application under 35 U.S.C. § 371 of International Application No. PCT/EP2018/078494, filed on Oct. 18, 2018, which claims the benefit of European Patent Application No. 17197353.0, filed on Oct. 19, 2017. These applications are hereby incorporated by reference herein.

FIELD OF THE INVENTION

The invention relates to a projection system, for instance for use in projecting images and/or for use in general lighting, as well as to a method for projecting an image.

BACKGROUND OF THE INVENTION

Projections systems are known in the art. For instance, US2008/0143970 describes that amber light LEDs have a higher luminance than red light LEDs. A vast majority of images displayed on television consists of colors that can be created using amber, green and blue components, with only a small percentage of red. In one embodiment of the present invention, the typically red primary light source in a projection display system is augmented with an amber light source. Green and blue primary light sources are also provided. All the light sources are high power LEDs. The particular mixture of the red and amber light is accomplished by varying the duty cycles of the red LEDs and the amber LEDs. If the RGB image to be displayed can be created using a higher percentage of amber light and a lower percentage of red light, the duty cycle of the amber LEDs is increased while the duty cycle of the red LEDs is decreased. Light/pixel modulators for creating the full color image from the three primary light sources are controlled to compensate for the variable amber/red mixture.

EP2182721 (A2) discloses a method, apparatus and system for projecting visible and non-visible images. The system and apparatus include: a visible light source and a non-visible light source; at least one light modulator enabled for receiving and modulating the visible light and non-visible light to respectively form visible images and non-visible images, the non-visible images formed independent of the visible images; and projection optics enabled for receiving and co-projecting the visible and non-visible images in alignment. Furthermore, video data for projection is formed by replacing a portion of visible bits with at least a portion of non-visible bits in a data stream, such that the visible images and the non-visible images can be co-projected upon processing the video data.

US2009/091717 (A1) discloses an image projector which includes a first light source that emits visible light and a second light source that emits invisible light and projects the visible light and the invisible light onto a screen. The screen includes a material, at least one of the visible light reflectance, transmittance and absorbance of which changes when irradiated with the invisible light projected. The image projector further includes a modulating section for modulating the intensities of the visible light and invisible light based on an image signal and a control section for controlling the modulating section.

JP2010191135A discloses a projection system for displaying high image quality images by using visible light and an ultraviolet ray emitted from a light source, and provides a projector. The projection system which includes the projector, and a screen. The projector includes an ultraviolet ray separation element for separating light emitted from the light source into the visible light and the ultraviolet ray; a first light modulation means for forming a visible image light by modulating the visible light on the basis of image signals; a second light modulation means for forming an ultraviolet image ray by modulating the ultraviolet ray in response to the visible image light formed with the first light modulation means; an optical synthesis prism for synthesizing the visible image light and the ultraviolet image ray; and a projection optical device for projecting the synthesized image light toward the screen.

DE102016111731B3 discloses a lighting device for a projector having a light modulator, which has a first and a second color wheel arranged one behind the other and each rotatable about an axis, wherein a first filter surface of the first color wheel in the direction of rotation at least three consecutively surface segments (R, G, B) are arranged which successively protrude during rotation in an illumination beam path of the illumination device and each forward illumination radiation of another subregion from the visible wavelength range, wherein at least one of the surface segments (R, G, B) of the first filter surface further transmits illumination radiation from the infrared region, and wherein a second filter surface of the second color wheel, a first surface segment, only illumination radiation from the visible wavelength range passes and a second surface segment, which forwards only illumination radiation from the infrared range, wherein the first and second surface segments are arranged one behind the other in the direction of rotation and protrude successively into the illumination beam path during rotation.

SUMMARY OF THE INVENTION

Video color images are typically formed using an array of small groups of red, green, and blue pixels. When the relative contributions of these three colors in an RGB pixel group are controlled, these three colors combine to create all colors in the video image. Projection display systems typically operate by illuminating one or more light modulators with very bright red, green, and blue light sources. The light source may be a very bright white light whose light is filtered to create red, green, and blue components. Such a white light source generates much heat and is inefficient since much of the light generated is other than red, green, and blue and is thus wasted. A more efficient light source consists of red, green, and blue LEDs, since no filtering is required and all the light generated is used to create the gamut of colors in the displayed image. The present application is directed to projection systems using LED light sources.

The light modulators may be small liquid crystal panels (called micro-displays) for each primary color. The red images, the green images, and the blue images are then combined by optics and projected on a screen. The projection may be a front projection or a rear projection.

Some other types of light modulators are micro-electro-mechanical system (MEMS) devices, such as the digital light processor (DLP™) made by Texas Instruments, where an array of micro-mirrors rapidly reflect red, green, and blue light components onto a screen. Each mirror corresponds to a pixel in the display. The angles of the mirrors determine whether the pixel is on or off, and the duty cycle determines the RGB components at each pixel location.

For large screen projection systems, the light must be very bright. To achieve such high brightness, multiple high-power LEDs of each color may be used. There may be a small array of LEDs for each primary color to obtain the desired brightness.

Projection systems are more and more used in stage lighting, retail lighting, etc. Hence, it is an aspect of the invention to provide an alternative projection system, especially having improved projection and/or lighting properties. The present invention may have as object to overcome or ameliorate at least one of the disadvantages of the prior art, or to provide a useful alternative.

In a first aspect, the invention provides a full color projection system ("system" or "apparatus") comprising:

a (full color) lighting system configured to provide first light including blue light, second light, and third light, wherein the first light, the second light, and the third light include light having a wavelength of 430 nm or larger;

a further light source configured to provide further light source light including one or more of UV light and short wavelength blue light having a wavelength of 420 nm or smaller, wherein the first light, second light, third light and the further light source light have mutually differing spectral power distributions;

a spatial light modulator system ("modulator", or "spatial modulator", or "modulator system", or "SLM") configured to receive the first light, the second light, the third light, and the further light source light, wherein the spatial light modulator system is configured to provide a plurality of pixels for providing projection system light with one or more of the first light, the second light, and the third light, and in one or more control modes the further light source light; and a control system ("controller") configured to control the spatial light modulator system (and especially also the further light source and the lighting system).

With such system, surprisingly bright white light can be created, especially when such light is used to illuminate people on stage, or elsewhere, where people may wear clothes with white parts, or other pieces of textile. It may also be used in retail, such as for example to illuminate products or shop racks with products, such as clothes. Such system may be used for displaying a full-color image. The term "full-color", like in the term "full-color projection system" herein implies that the system is able to provide full-color projection or lighting. However, this does not exclude that the system may be able to provide in one or more control modes white light and/or in one or more other control modes a single color, etc. The term "image" may also refer to a plurality of different images, like in a movie. The image may contain one or more of a concrete image, an abstract image, a pattern, text, a number, etc. The display system may be used to display an image on a screen. However, the system may also be used to display in image on an (other) object or on a human.

Alternatively or additionally, such system may be used for lighting, such as general lighting. For instance, the system may be used for stage lighting, but may also be used for general lighting. The system may allow providing white light with a relative high color rendering index. Hence, in embodiments the system may be used for providing white projection system light having a color rendering index (CRI) of at least 75, like at least 80. Note that in embodiments of the system, the system may be used in a mode for (general) lighting and at another time in a mode for projection of images.

In the present invention, different types of lighting systems may be applied.

The invention is defined by the independent claims. The dependent claims define advantageous embodiments.

In embodiments, the lighting system may comprise a blue light source, such as a laser light source, and a green/yellow/red light source, such as a LED pumped luminescent ceramic concentrator based on cerium in a garnet (host) material (such as e.g. described in WO2006/054203, which is herein incorporated by reference), that has intensity in the green/yellow and red. In such system, a color wheel may be applied to distinguish (in time) between the primary colors red and green (and blue). Especially, such embodiments may be applied with a DLP solution. A color wheel may be applied as optical filter, to filter the desired colors out of the spectral distribution of the offered light/to filter away undesired colors from the spectral distribution of the offered light. For instance, the application of a color wheel is described in U.S. Pat. No. 5,967,636 or WO2009069010, which are herein incorporated by reference.

In embodiments, basically at least three different light sources may be applied to generate a full color projection or lighting. Hence, the first light source, the second light source, and third light source are selected such that together they may provide white light. In such embodiments, especially DLP, 3DLP or 3LCD may be applied, etc. In such embodiments, the respective light sources may especially provide the primary RGB colors, though other solutions, such as with an optical filter, may also be possible.

Hence, the lighting system may especially be configured to provide the first light, the second light and the third light, even more especially RGB, optionally with the aid of one or more optical filters, such as e.g. with a color wheel. Further, the lighting system may provide the first light, the second light and the third light simultaneously or sequentially.

In embodiments, the spectral distribution of the first light essentially includes blue light, such as at least 50%, even more especially at least 70%, such as at least 80%, like at least 90% of the spectral power is in the blue wavelength range. Especially, the first light essentially has a single peak having a maximum in the blue wavelength range, especially at a wavelength larger than 430 nm, such as in the range of 440-495 nm, even more especially in the range of 440-480 nm.

In embodiments, the spectral distribution of the second light essentially includes green and/or yellow light, such as at least 50%, even more especially at least 70%, such as at least 80%, like at least 90% of the spectral power is in the green and/or yellow wavelength range. Especially, the second light essentially has a single peak having a maximum in the range of 495-590 nm, even more especially in the range of 510-580 nm.

In embodiments, the spectral distribution of the third light essentially includes red light, such as at least 30%, such as at least 40%, even more especially 50%, even more especially at least 70%, such as at least 80%, like at least 90% of the spectral power is in the red wavelength range. Especially, the third light essentially has a single peak having a maximum in the range of 600-780 nm, even more especially in the range of 605-680 nm.

The terms "violet light" or "violet emission" especially relates to light having a wavelength in the range of about 380-440 nm. The terms "blue light" or "blue emission" especially relate to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The terms "visible", "visible light" or "visible emission" refer to light having a wavelength in the range of about 380-780 nm. UV may relate to wavelengths below 380 nm, such as in the present invention especially in the range of 300-380 nm. Such light also trigger vitamin D production in the skin.

The lighting system may include at least two different light sources, such as at least three different light sources. The light sources may especially include solid-state light sources or solid-state based light sources.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of light sources, such as 2-2000 solid-state light sources. The term "light source" may also refer to the combination of a luminescent concentrator and a plurality of (solid-state) light sources configured to pump the luminescent material of the luminescent concentrator, such as e.g. described in WO2006/054203, which is herein incorporated by reference.

In embodiments the first light source may generate first light including blue light. This implies that the spectral distribution of the first light at least includes blue light. Especially, the first light source includes a solid-state light source having essentially a single peak having a maximum in the blue wavelength range, especially at a wavelength larger than 430 nm, such as in the range of 440-495 nm, even more especially in the range of 440-480 nm. Hence, in embodiments the first light source is configured to provide blue light (only). The term "first light source" may also refer to a plurality of essentially similar light sources, such as of the same bin.

In embodiments the second light source may generate second light including green and/or yellow light and optionally red. This implies that the spectral distribution of the second light at least includes green and/or yellow light, and optionally red. Especially, the second light source includes a solid-state light source having essentially a single peak having a maximum in the range of 495-590 nm, even more especially in the range of 510-580 nm. Hence, in embodiments the second light source is configured to provide green and/or yellow light (only). Alternatively, the second light source includes a (solid-state) light source and a converter configured to convert at least part of the light source light of the (solid-state) light source into converter light. The second light may essentially consist of the converter light, and may thus include green and/or yellow light and optionally red. For instance, the second light source is configured to generate second light having a single peak having a maximum in the range of 495-590 nm, even more especially in the range of 510-580 nm, and having a substantial full width half maximum (FWHM), such as at least 50 nm, like at least 75 nm. The term "second light source" may also refer to a plurality of essentially similar light sources, such as of the same bin.

In embodiments, as indicated above, the second light source may have a spectral distribution also including red light. In such embodiments, the second light source may be used in combination with an optical filter, e.g. a color wheel to choose (in time) the desired color. Green and red may then be offered as function of time.

However, also a separate third light source may be applied. In embodiments the third light source may generate third light including red light. This implies that the spectral distribution of the third light at least includes red light. In embodiments, the spectral distribution of the third light essentially includes red light, such as at least 50%, even more especially at least 70%, such as at least 80%, like at least 90% of the spectral power is in the red wavelength range. Especially, the third light source includes a solid-state light source having essentially a single peak having a maximum in the range of 600-780 nm, even more especially in the range of 605-680 nm. Hence, in embodiments the third light source is configured to provide red light (only). The term "third light source" may also refer to a plurality of essentially similar light sources, such as of the same bin.

Hence, in embodiments the system may include a first light source configured to provide first light, especially including blue light, and a second light source configured to provide second light, especially including one or more of green and yellow light, and third light, especially including red light, wherein the system may especially further include a color wheel for selecting one or more of the second light and third light, and optionally the first light.

Hence, in other embodiments the system may include a first light source configured to provide first light, especially including blue light, a second light source configured to provide second light, especially including one or more of green and yellow light, and a third light source configured to provide third light, especially including red light. The first light source may e.g. also be indicated as blue light source; the further light source may also be indicated as short wavelength blue/UV light source. Dependent upon the chosen embodiment, the second light source may also be indicated as green light source, and the third light source may also be indicated as red light source; or the second light source may be indicated as green/yellow/red or green/red light source. The third light may thus in embodiments be generated by the third light source (with a second light source for green (second) light) or by the second light source (which also provides green (second) light). Therefore, in specific embodiments the lighting system comprises a first light source configured to provide first light including blue light, a second light source configured to provide second light (including one or more of green and yellow light), a third light source configured to provide third light (including red light), wherein the first light, the second light, wherein the first light source, the second light source, the third light source, and the further light source are solid-state light sources.

Hence, the first light, the second light, and the third light include light having a wavelength of 430 nm or larger. More especially, the first light (source), the second light (source), and the third light (source) may have spectral power distributions with less than 15%, even more especially less than 10%, yet even more especially less than 5% of the power at wavelengths below 430 nm, relative to the total power in the visible spectral range (which is defined as 380-780 nm). Therefore, essentially all power in the visible may be in the wavelength range of 430-780 nm.

Hence, the present invention may be used in systems that use the DLP technology. DLP, or digital light processing, uses a matrix of tiny mirrors to reflect light toward the screen (an "on" pixel) or away (an "off" pixel). Hence, the system may use a DLP mirror chip, which includes a reflective surface made up of thousands (or millions) of controllable tiny mirrors. Each mirror represents a single pixel. In a DLP projector, light from light source is directed onto the surface of the DLP mirror chip. The mirrors tilt back and forth, directing light either into the lens path to turn the pixel on, or away from the lens path to turn it off. This may happen with a high frequency, such that the human eye does not essentially see the periodic changing color but experience a singly type of light (from the respective pixel(s)).

When at least three different light sources are used, it is also possible to use three separate DLP mirror chip, one each for the red, green, and blue channels. In such embodiments, it is possible to simultaneously irradiate the three (or optionally four) SLMs, such as the DLP mirror chips. It is also possible to use a single DLP chip; in such instance the light of the at least three light sources may consecutively be provided to the DLP mirror chip. In such embodiments, the red, green, and blue light (and optional further light source light) may irradiate the SLM, such as the DLP mirror chip, sequentially.

The mirror chip may also be indicated as DMD (digital mirror device). Hence, in embodiments the spatial light modulator system is multi micro-mirrors based.

The present invention may also be used in an LCD (liquid crystal display) based system, often indicated as 3LCD, as to each color a LCD is dedicated. LCD projectors use three liquid crystal panels, each tasked with creating an image using just one of the primary colors (red, green, and blue). All three may be projected at once. Therefore, in such embodiments, it is possible to simultaneously irradiate the SLMs, such as the three (or optionally four) LCDs. Hence, in embodiments the spatial light modulator system is multi-LCD based.

The phrase "or optionally four" refers to embodiments wherein three SLMs are applied, and the further light source light is irradiated on one or more of such SLMs, or embodiments wherein a further SLM is applied, to be irradiated by the further light source light, with the other SLMs being configured to be irradiated by the first light, second light and third light, respectively.

The present invention may also be used in a LCoS (liquid crystal on silicon) based system. Such LCoS based system may be considered a kind of a hybrid between LCD and DLP. It uses liquid crystal chips with a mirrored backing. So they are reflective, like DLP, but also may block light using liquid crystal, like LCDs.

Systems based on other (SLM) principles may also be used.

As indicated above, the term "SLM" may also refer to a plurality of (different) SLMs.

The combination of lighting system and SLM(s) is configured to project the image.

The (three) light sources may essentially provide the light that is necessary for the image of lighting of the projection system. Hence, the lighting system may also be indicated as "full-color lighting system". As indicated above, however, the system further comprises a further light source. This further light source may be less essential for the image, but may especially allow special effects in the sense that an object receiving light of the further light source may seem brighter.

The further light source is configured to provide further light source light including one or more of UV light and short wavelength blue light having a wavelength of 420 nm or smaller, such as in the range of 300-420 nm, even more especially not larger than 400 nm. This implies that the spectral distribution of the further light source light at least includes one or more of UV light and short wavelength blue light. Hence, in embodiments the further light source is configured to provide further light source light having a wavelength of 400 nm or smaller.

In embodiments, the spectral distribution of the further light source light essentially includes UV and/or short wavelength blue light, such as at least 50%, even more especially at least 70%, such as at least 80%, like at least 90% of the spectral power is in the one or more of UV light and short wavelength blue light, especially in the range of 300-420 nm. Especially, the further light source includes a solid-state light source having essentially a single peak having a maximum in the range of in the range of 300-420 nm, even more especially in the range of 300-400 nm. Hence, in embodiments the further light source is configured to provide UV light and short wavelength blue light (only). Especially, the further light source may have spectral power distributions with less than 15%, even more especially less than 10%, yet even more especially less than 5% of the power at wavelengths above 420 nm, relative to the total power in the visible spectral range (which is defined as 380-780 nm). Therefore, essentially all spectral power may be in the wavelength range of 300-420 nm, such as in the range of 300-400 nm. In embodiments, the further light source light comprises UV light; especially the further light source light essentially consists of UV light. The term "further light source" may also refer to a plurality of essentially similar light sources, such as of the same bin.

Hence, the first light, second light, third light and the further light source light have mutually differing spectral power distributions.

As indicated above, the system further comprises a spatial light modulator system. This spatial light modulator system includes e.g. the three LCDs, or the DLP, or the three DLPs. The spatial light modulator system may also include a LCoS or three LCoSs. The spatial light modulator system provides the pixels. The term pixel may also refer to a set of pixels, such as in the case of a RGB pixel. For instance, in the case of 3LCD or 3DLP, in fact three spatially different positions may provide a RGB pixel. In case of DLP, different colors may be sequentially provided to the same pixel, which may switch on and off dependent upon the desired color (combination). Such pixel can also be considered a RGB pixel, but may have this characteristic over time.

Therefore, the system further comprises a spatial light modulator system configured to receive the first light, the second light, the third light, and the further light source light. Hence, the light sources and modulator are configured such, that the modulator can receive the light source light of the light source. The modulator is configured in a light receiving relationship with the light sources. The spatial light modulator system is configured to provide a plurality of pixels for providing projection system light with one or more of the first light, the second light, and the third light, and in one or more control modes the further light source light. As indicated above, the first, second, and third light may especially be used for creating colors or full-color images; the further light source may be used to provide a special effect to the light, and may e.g. give a crisp white effect. This further light source may be provided in different ways, such as permanently, or temporarily, or dependent upon the light or image to be created, etc., see further also below. Temporarily may refer to "for a limited period of time" i.e. "during a first period of time, but not during a second period of time" or "not permanently".

In embodiments, the spatial light modulator system may especially be configured to modulate during operation of the projection system one or more of the first light, the second light, third light, and the further light source light to provide an image (or a beam of light for illuminating an object (with the image)).

Optional optics downstream of the spatial light modulator system may shape the beam. However, the spatial light modulator system may also shape the beam. When pixels are switched of, no light will escape from the system via those pixels. In this way the beam shape may also be influenced and e.g. projections system light may have a cross-section essentially similar to an object that is illuminated with the projection system light. Optics may include one or more of one or more (dichroic) mirrors, one or more (dichroic) prisms, one or more lenses, etc.

The system may further include a control system. Especially, the control system is configured to control the spatial light modulator system. In this way, the image may be projected. Hence, the control system may e.g. translate a digitally provided image to settings of the spatial light modulator system, such as e.g. which mirrors provide which color at which time (to which direction). In embodiments, the control system may also control the lighting system and/or the further light source. As indicated above, the lighting system may include two or more different light sources, such as a first light source and a second light source, or a first light source, a second light source, and a third light source. In such embodiments, the phrase "control the lighting system" may also refer to controlling the respective light sources, such that one may be switched off, and another may be switched on, and vice versa. In specific embodiments, the phrase "controlling the light source" or "controlling the lighting system" and similar light sources may also include controlling the intensity of the light generated by such system or light source respectively.

When a color wheel is available, also the color wheel may be controlled, such as switching on and off, or optionally controlling the rotational frequency.

The control system may thus effectively control the projection system light. Control may e.g. be done as function of instructions provided to the control system and/or instructions based on a data carrier comprised by the control system or functionally coupled to the control system. Controlling can especially be done by controlling the intensity of the first, second, third, and further light source light, as well as by controlling the (pixels of the) SLM.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc.

Beyond that, the term "controlling" and similar terms may additionally include monitoring. Hence, the term "controlling" and similar terms may include imposing behavior on an element and also imposing behavior on an element and monitoring the element.

The term "control system" may also refer to a plurality of (interrelated) control systems, wherein e.g. one control system may be a master control system and the other control system(s) may be slave control system(s) controlled by the master system.

The control system may also be configured to control the projection system light in dependence of input information. Input information may e.g. include one or more images, which can be selected to be shown, optionally as function of time, such as in the case of a movie.

For instance, the projection system may comprise or may be functionally coupled to a (remote) computer that provides an image, or one or more images that can be selected, or one or more images in time (like in the case of a movie), which are processed by the control system, which may be comprised by the computer or of which the computer may be part, into signals to the spatial light modulator, the lighting system and the further light source, to create the image(s).

The control system may control the lighting system and the further light source independently, especially in the sense that one may be temporarily switched on while the other is then switched off and/or increasing intensity of the light of the lighting system or the further light source light does not necessarily imply also an increasing in the intensity of the other of the light of the further light source or the lighting system. However, as indicated above, the further light source light may also be coupled with one of the first light, the second light and the third light. In such embodiments, the control system may e.g. control the lighting system, and thereby control the further light source.

The term "controlling the lighting system" and similar terms may in embodiments also refer to controlling a first light source configured to generate the first light, controlling a second light source configured to generate second light, and controlling a third light source configured to generated third light.

The term "controlling the spatial light modulator system" and similar terms may include controlling one or more multi-micro mirrors and/or controlling one or more LCDs. Hence, the term "controlling the spatial light modulator system" and similar terms may refer to providing a specific pixel setting (as function of time) as function of the input information.

The phrases "controlling a further light source" or "controlling the lighting system" and similar phrases may refer to controlling the intensity of the light generated by such further light source and lighting system, respectively, and may in the case of the lighting system also refer to controlling the spectral distribution of the light generated by the lighting system.

The further light source may be controlled independently of the other light source(s) and/or lighting system. However, it may also be possible that the further light source and the first light source provide their light simultaneously. This may have as advantage that an additional channel is not necessary. Hence, in embodiments the projection system is configured to simultaneously provide the first light and the further light source light.

However, in embodiments the further light source may also be controlled without a necessary coupling with the source(s) and/or lighting system. This may have as advantage an optimal use of the different light sources, especially the further light source, such as essentially only under conditions wherein the small wavelength blue/UV light is really desired. Hence, in embodiments the projection system may especially be configured to sequentially provide the first light, the second light, the third light, and the further light source light, to the spatial light modulator system.

Hence, in embodiments the same pixels that (temporarily) provide one or more of the first light, the second light, and the third light, may also be used to provide the further light source light. This may e.g. be achieved when the further light source light accompanies one (or more) of these lights, such as e.g. when there is a single channel for the further light and the first light. However, in other embodiments the further light may (also) accompany the second (and/or third light). However, this may also be achieved when a time of one or more of the first light, the second light, and the third light is followed in time by the fourth light. For instance, assuming a mirror based embodiment, such as in the case of a DMD solution, the mirrors may during a specific time configured to reflect in the desired direction for lighting or image creating one or more of the first light, the second light, and the third light, followed by reflecting with the same mirrors (and thus the same pixels) the further light (in the same direction). When this is done with a high frequency, such as at least 60 Hz, the eye will not perceive different types of light, but a mixture of the further light source light and the one or more of the first light, the second light, and the third light. When such light is e.g. projected on a white piece of clothes, this may appear especially bright. Therefore, in embodiments when during operation one or more pixels are temporarily configured to provide one or more of the first light, the second light, the third light, the projection system is configured to provide also the further light source light via one or more of those one or more pixels. As indicated above, in embodiments the blue light and the further light may be coupled in a single channel. In such embodiments, the blue light will always be accompanied with UV light. However, this may also apply when the blue light is always preceded and/or succeeded by the further light source light.

Therefore, in embodiments the projection system may be configured to provide the further light source light separated in time from one or more of the first light, the second light, and the third light, such as in embodiments separated in time from all of the first light, the second light, and the third light. In such instances, assuming the use of a single SLM, two or more different pixel settings may be applied for the different types of light.

However, in (other embodiments) the further light source light may be provided simultaneously with one or more of the first light, the second light, and the third light. Especially, this may be simultaneously with one of these different types of light, especially parallel with blue light. Hence, in embodiments the projection system is configured to provide the further light source light simultaneously with at least one of the first light, the second light, and the third light. In such instances, assuming the use of a single SLM, the same pixel settings may be applied for the further light source light and the other light, especially the first light, with which the further light source light is simultaneously applied.

In specific embodiments, the invention provides an embodiment of the projection system, wherein the projection system is configured to sequentially provide the first light, the second light, the third light, and the further light source light,
wherein the first light is projected onto the first SLM in a first pixel setting, the second light is projected onto the first SLM in a second pixel setting, the third light is projected onto the first SLM in a third pixel setting,
wherein the first pixel setting is different form the second pixel setting and the second pixel setting is different form the third pixel setting,
further light source is projected onto the first SLM and/or the second SLM and/or the third SLM.

In yet specific embodiments, the invention provides an embodiment of the projection system, wherein the projection system is configured to simultaneously provide the first light, the second light, the third light, and the further light source light,
wherein the first light is projected onto the first SLM in a first pixel setting, the second light is projected onto the second SLM in a second pixel setting, the third light is projected onto the third SLM in a third pixel setting,
wherein the first pixel setting is different form the second pixel setting and the second pixel setting is different form the third pixel setting,
and wherein further light source is projected onto the pixels in one of the first pixel setting, the second pixel setting and the third setting.

Therefore, the phrases "temporarily configured to provide white projection system light, and wherein the projection system is configured to provide also the further light source light via one or more of those one or more pixels", or "temporarily configured to provide one or more of the first light, the second light, the third light, the projection system is configured to provide also the further light source light via one or more of those one or more pixels" and similar phrases may include embodiments wherein during the temporary configured the further light source light is provided, but may also include embodiments wherein after and/or preceding the provision of the indicated light during the temporary configuration, the further light source light is provided. Hence, these phrases may refer to sequentially and/or simultaneously providing the indicated types of light.

The further light source light may (in yet other embodiments) also be coupled with white light. Hence, only when white light is provided, also the further light source light is provided.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

Hence, the further light source light may in embodiments only be provided in combination with white light. As white light is composed of different types of light, which may be provided sequentially, the further light source light may be included in the sequence of light, such that white light enriched with further light source light is provided (over time). The human eye will perceive the white light enriched with the further light source light and/or the consequence thereof on e.g. white textile. Hence, in embodiments when during operation one or more pixels are temporarily configured to provide white projection system light, the projection system is configured to provide also the further light source light via one or more of those one or more pixels (after and/or preceding to providing the white light). When the cross-section of the beam of light that is provided, such as for projecting an image, only contains a relative small part with (essentially) white light, then it may not necessary to admix (in time) further light source light. However, when a plurality of pixels, such as an entire substantial subarea of the cross-section comprises white light, it may be desirable to admix (in time) further light source light.

Therefore, in embodiments when the projection system is configured to provide also the further light source light via one or more of those one or more pixels only when (during operation) a predefined minimum number of pixels are temporarily configured to provide the white projection system light. The predefined number of pixels may especially be defined as at least 10% of the total number of pixels, such as at least 20% of the total number of pixels, like at least 30% of the total number of pixels.

Alternatively or additionally, the area of adjacent pixels that provide white light may be taken into account. Therefore, in embodiments the projection system may be configured to provide also the further light source light via one or more of those one or more pixels only when (during operation) a predefined minimum number of pixels in a cluster of neighboring pixels are temporarily configured to provide the white projection system light.

Alternatively or additionally, the admixing of the further light source light may be dependent upon the color temperature of the white light. As for white light with a relative low color temperature it may be less desirable to create a brightening effect, admixing of the further light source light may especially be of relevance when white light is applied with relatively higher color temperatures. Hence, in embodiments the projection system is configured to provide also the further light source light via one or more of those one or more pixels only when (during operation) the one or more pixels are temporarily configured to provide the white projection system light having a correlated color temperature of at least 3000 K, such as at least 3500 K, even more especially having a correlated color temperature of at least 3700 K, such as at least 4000 K.

Hence, in embodiments the admixing of the further light source light may be dependent upon one or more of the number of white pixels in the image to be projected and the color temperature of the white pixels in the image to be projected. There may be a lower threshold for the number of pixels or the number of adjacent pixels, above which the further light source light is admixed (and below which no further light source light is admixed) (see above embodiments). There may be a lower threshold of the color temperature, above the further light source light is admixed (and below which no further light source light is admixed) (see above embodiments). As indicated above, admixing may imply admixing simultaneously and/or sequentially. To the human eye however, it will be experienced as admixing.

Therefore, in specific embodiments the control system is configured to control the further light and the SLM as function of the type of white and/or white content in the image; see examples above. Hence, the control system, or computer program product running on a computer comprised by or functionally coupled to the projection system, may include a routine wherein the further light and the SLM as function of the type of white and/or white content in the image.

Hence, in specific embodiments the lighting system and the further light source, or more especially the one or more light sources of the lighting system and the further light source may independently be controllable. Therefore, in specific embodiments the first light source, the second light source, the (optional) third light source, and the further light source may independently be controllable.

The system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, or LCD backlighting.

The herein described projection system may e.g. be used in the herein described projection method (i.e. method for projecting an image).

In yet a further aspect, the invention also provides a method for projecting an image, the method comprising:
 providing one or more of first light including blue light, second light including one or more of green and yellow light, third light including red light, wherein the first light, the second light, and the third light include light having a wavelength of 430 nm or larger;
 using a projection system comprising a further light source configured to provide further light source light including one or more of UV light and short wavelength blue light having a wavelength of 420 nm or smaller, wherein the first light, second light, third light and the further light source light have mutually differing spectral power distributions;
 irradiating with one or more of the first light, the second light, the third light, and the further light source light a spatial light modulator system comprised by the projection system, wherein the spatial light modulator system is configured to provide a plurality of pixels for providing projection system light with one or more of the first light, the second light, and the third light, and in one or more control modes the further light source light.

By (consecutively) irradiating the SLM(s) the image can be projected (in the far field). As indicated above, one or more optics may (further) be applied to provide the image, e.g. for combining two or more of the different types of light, for instance with a dichroic mirror or dichroic prism.

In yet a further aspect, the invention also provides a computer program product, when running on a computer which is comprised by or functionally coupled to the projection system, especially as defined herein, is capable of bringing about the method as described herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
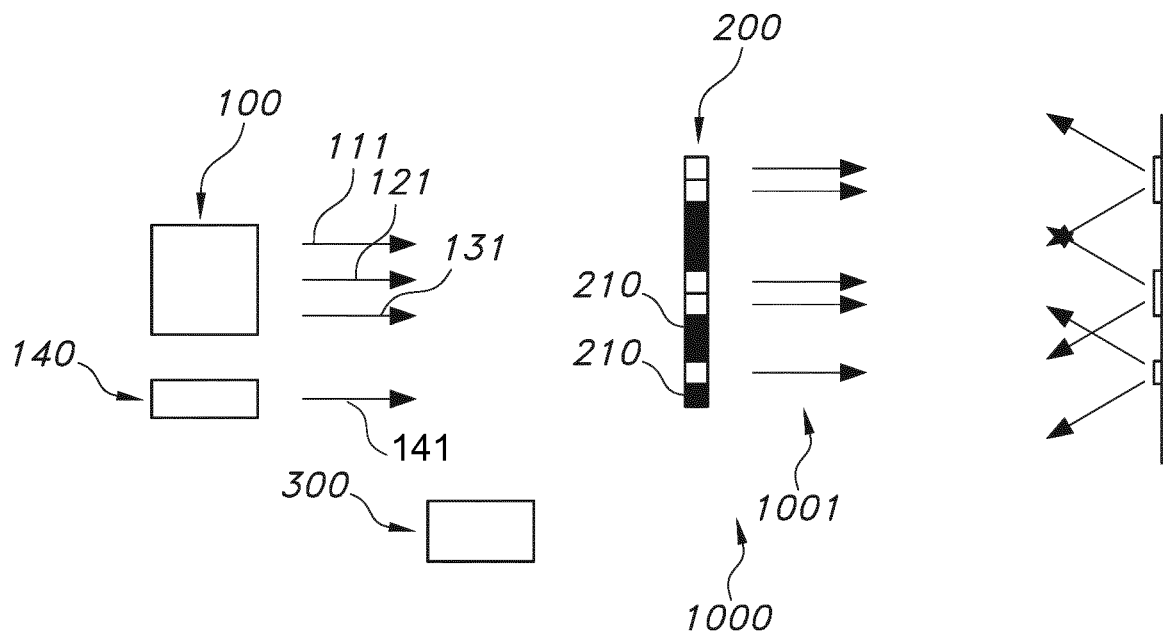
FIGS. 1a-1c schematically depict some aspects of the projection system.

FIG. 1a very schematically depicts an embodiment of a full color projection system 1000. The system comprises a lighting system 100 configured to provide first light 111 including blue light, second light 121 including one or more of green and yellow light, third light 131 including red light, wherein the first light 111, the second light 121, and the third light 131 include light having a wavelength of 430 nm or larger. The lighting system 100 may comprise one or more light sources. Separation of colors can be done by controlling two or more light sources and/or with the aid one or more optical filters, such as e.g. a color wheel. A color wheel may also be indicated as optical filter wheel, and has sections which transmission for different colors and/or absorption of different colors, such that one or more primary colors remain.

The system 1000 further comprises a further light source 140 configured to provide further light source light 141 including one or more of UV light and short wavelength blue light having a wavelength of 420 nm or smaller. The first light 111, second light 121, third light 131 and the further light source light 141 have mutually differing spectral power distributions, such as e.g. blue, green, red and UV.

Yet, the system 1000 further comprises a spatial light modulator system 200 configured to receive the first light 111, the second light 121, the third light 131, and the further light source light 141. Here, the modulator system 200 is indicated a single element, but the modulator system 200 may also include a plurality of elements, such as a plurality of modulator systems, e.g. for each primary color. The modulator system 200 is especially configured for providing projection system light 1001 with one or more of the first light 111, the second light 121, and the third light 131, and in one or more control modes the further light source light 141. Here, by way of example some pixels, indicated with reference 210 are open for the upstream light, and some are closed (indicated as dashed pixels 210). Of course, this may change in time.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The system 1000 may also comprise a control system 300 configured to control the spatial light modulator system 200. The control system will in general also control the lighting system 100 and the further light source 140. The control system 300 may thus control the composition (and direction) of the projection system light 1001.

Figure 1B:
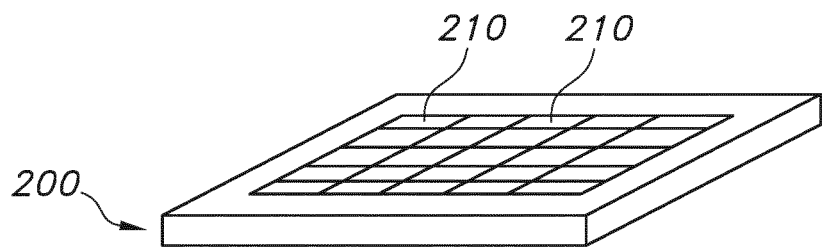
Figure 1C:
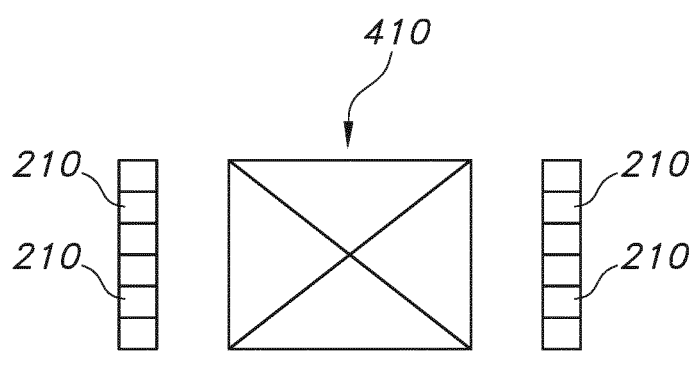

FIG. 1b schematically depicts an example of a spatial light modulator system 200, here especially a mirror based embodiment, such as a DMD. FIG. 1c schematically depicts a 3LCD solution. Reference 410 indicates an optical element that can redirect the relevant light, such as one or more (dichroic) prisms.

Dichroic prisms or dichroic mirrors can be used to combine light of different colors. For instance, a dichroic mirror can be used to combine RGB light which falls sequentially on a SLM. In 3LCD a dichroic prism is used to combine pixelated RGB light.

Figure 2A:
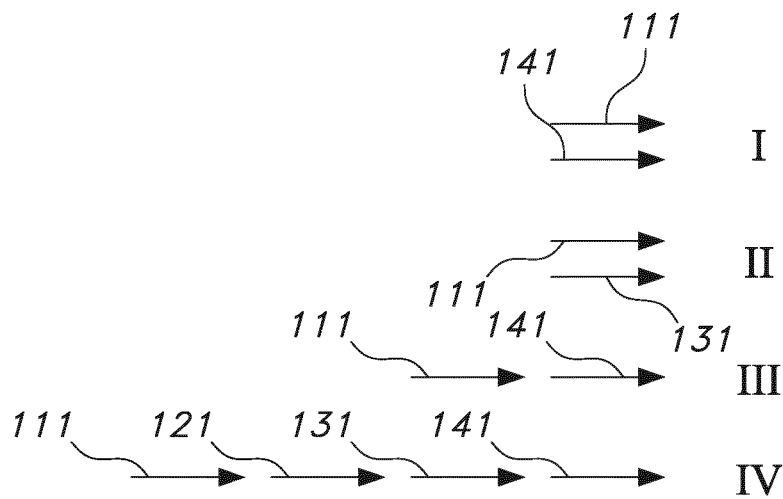
FIGS. 2a-2c schematically depict some variants.

FIG. 2a schematically depicts some possible options of generating light including the further light source light. For instance, this may be generated parallel to the first light 111 (variant I), but also parallel to other light, by way of example third light 131 (variant II). The different types of light may also be provided sequentially, such as e.g. further light source light 141 coupled to first light 111, but provided sequentially, either by using a color wheel and/or by using controlled light sources, see variant III. The further light source light 141 may also be coupled with white light, such as shown in variant IV, wherein all three primary colors may be available, indicated with light 111,121 and 131.

Figure 2B:
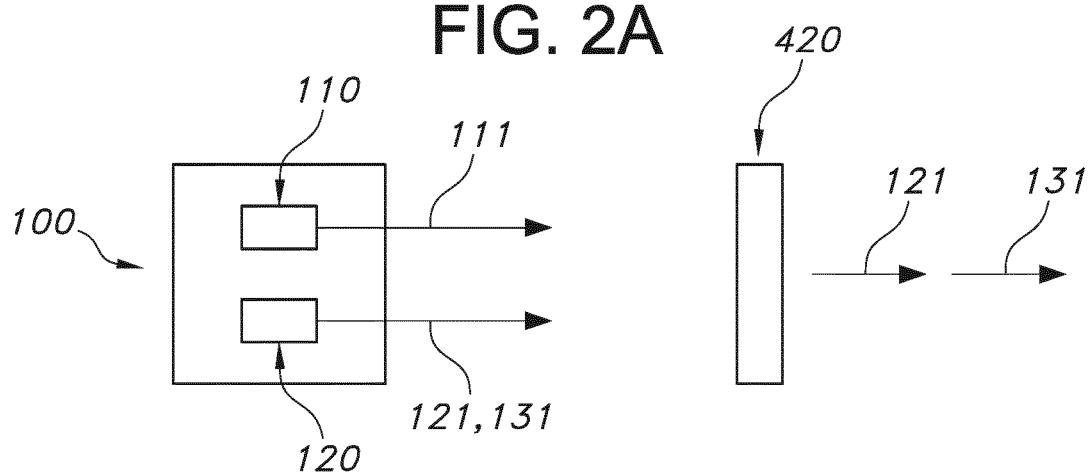
Figure 2C:
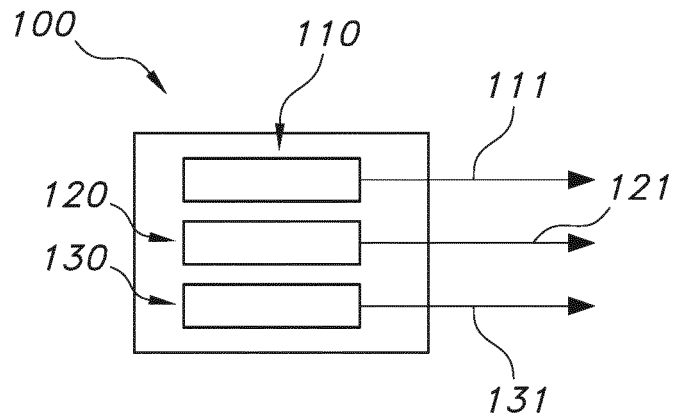

FIG. 2b schematically depicts an embodiment of a lighting system 100, including two light sources, e.g. for blue a first light source 110 and for green and red a second light source 120, e.g. YAG:Ce, pumped by a blue LED, and having emission intensity in the green, yellow, and red. Reference 420 indicates an optical filter, especially a color wheel, configured downstream of the first light source 110 and second light source 120. A color wheel may e.g. sequentially provide the different types of light, here only by way of example schematically indicated with second light 121 and third light 131. FIG. 2c schematically depicts an embodiment of the lighting system 100 including three light sources 110, 120, and 130, for e.g. generating blue, green, and red, schematically indicated with references 111, 121, and 131.

Hence, amongst others, it is herein suggested to provide a projection lighting system which uses next to normal RGB light sources also short wavelength blue (SWB) (<420 nm) and/or ultra violet (UV) light, such as <400 nm, in order to obtain crispy white in the white portions of an image. These wavelengths are (hardly or) not visible for the human eye, but excite brighteners in clothing, carpets, furniture, wallpaper, etc. The projected light combined with the converted light by the brightener results in vivid colors. For this purpose, e.g. the blue channel can be extended with SWB and/or UV preserving the conventional configuration used in projectors.

Figure 3:
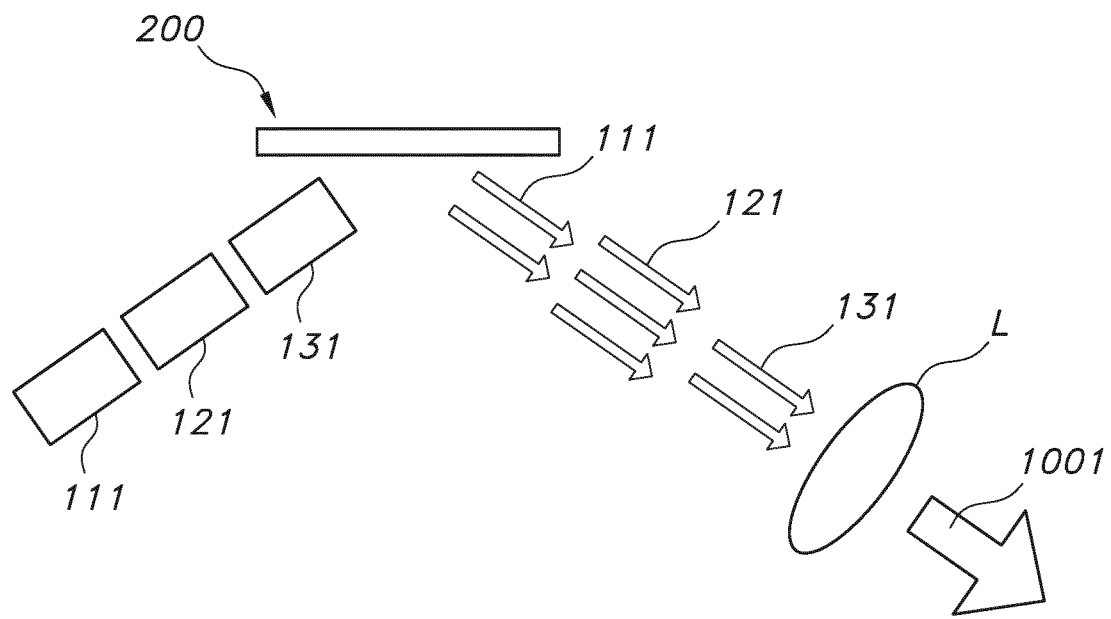
FIGS. 3-15 schematically depict some further embodiments and variants.
Figure 4:
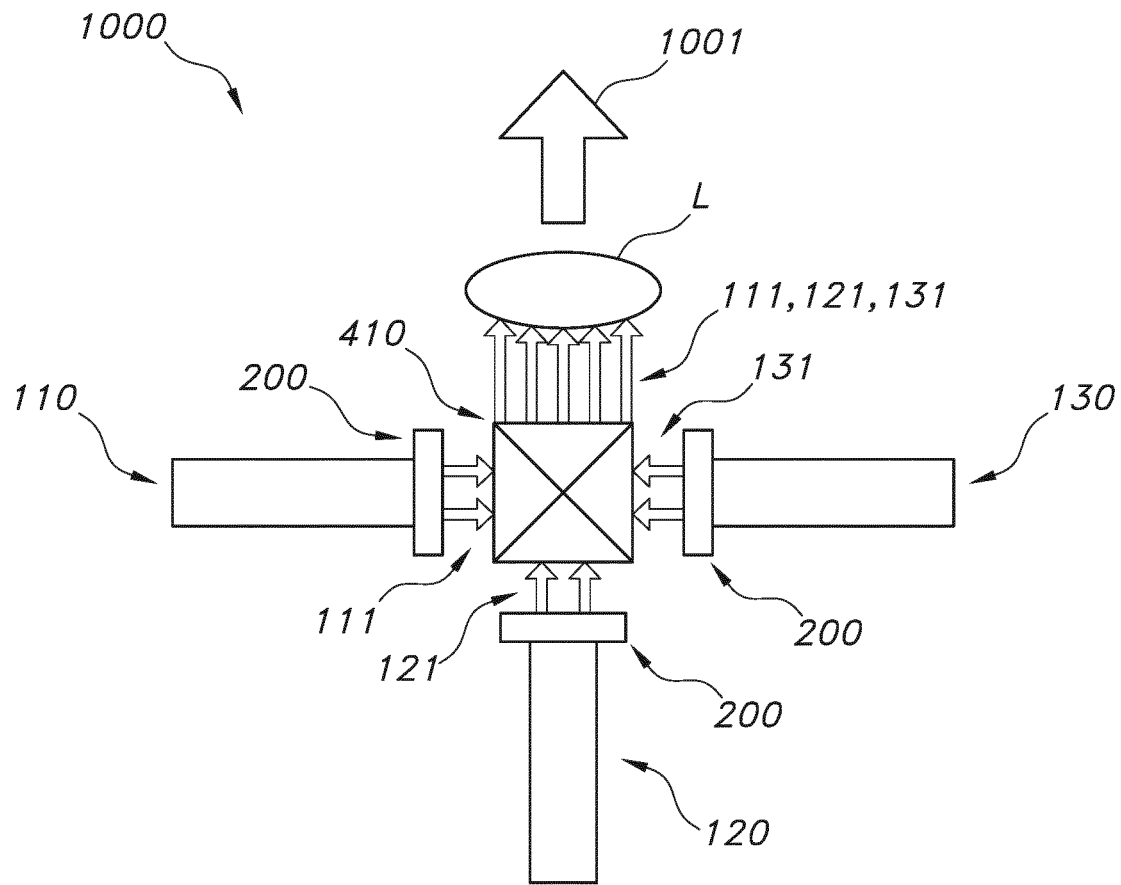

In digital projection applications RGB LEDs (or full laser), phosphor converted laser light or the combination of the two solutions are may e.g. be used. The light engines are used in combination with at least one spatial light modulator (SLM). Most configurations use either a DLM (or DLP or DMD) or a 3LCD spatial light modulator (FIGS. 3 and 4). The basic differences are that: both technologies are based on different principles, i.e. red (R), green (G) and blue (B) light is projected on the DLM sequentially (see FIG. 3), or 3LCD uses 3 LCD cell and red (R), green (G) and blue (B) light is continuously projected on an individual LCD panel (see FIG. 4). Due to the technical progress in SSL (solid-state lighting), besides video projection also lighting applications are in reach such as stage and retail lighting. Obtaining vivid white in these applications is very important. Reference L indicates a lens.

Other and/or additional optics may be present then depicted in the schematic drawings herein.

Figure 5:
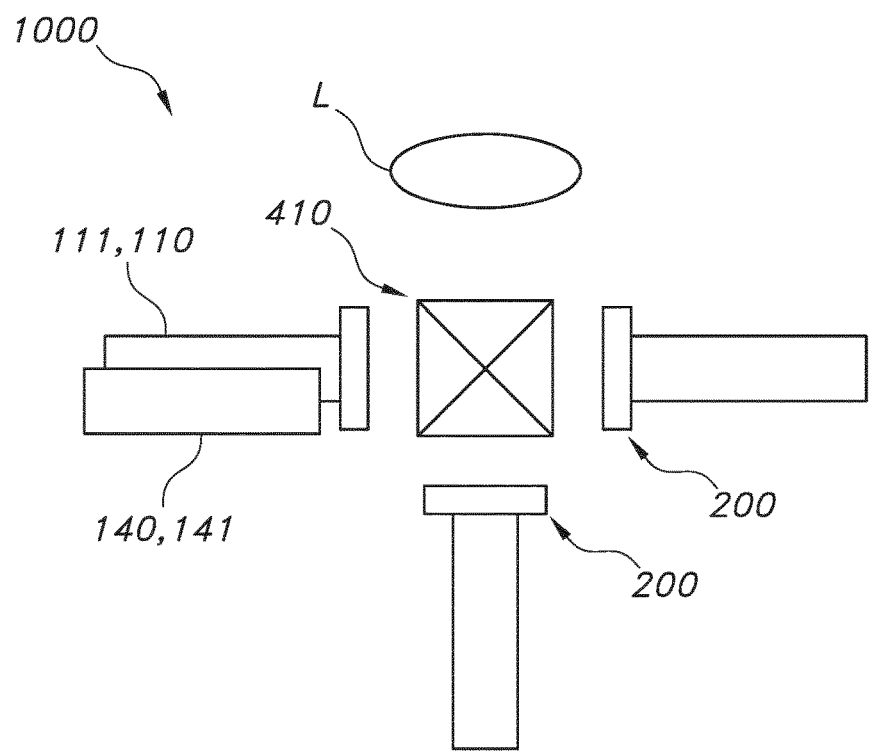
Figure 6:
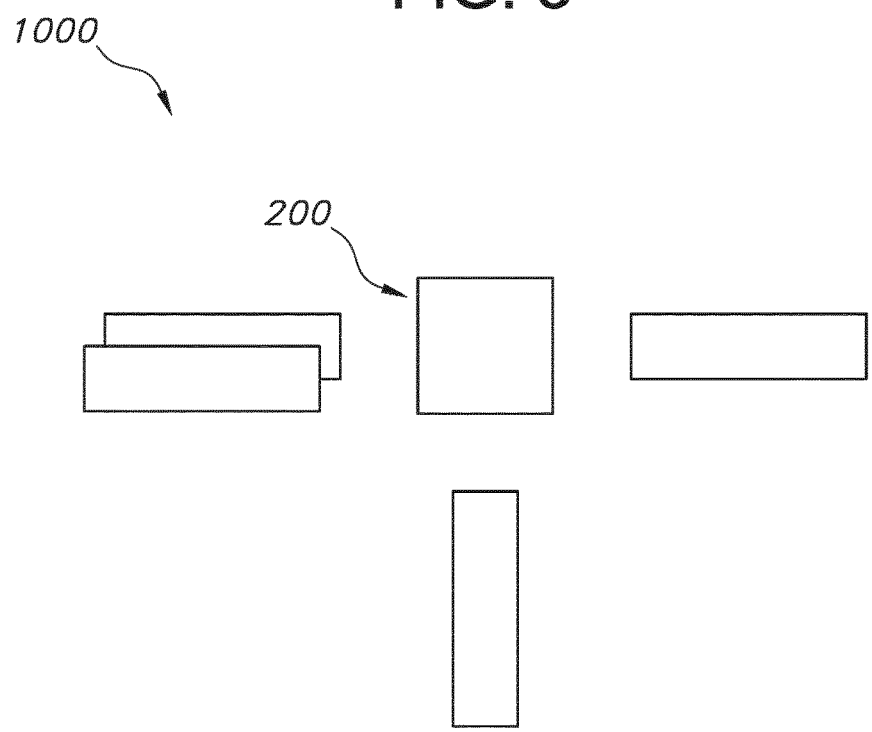

For this purpose, e.g. the blue channel can be extended with SWB and/or UV preserving the conventional configuration used in projectors (FIG. 5 LCD light engine; FIG. 6 DLP light engine).

Figure 7:
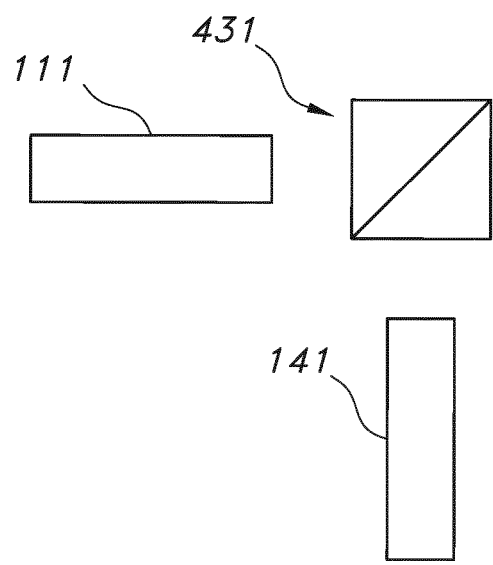

The blue and UV light source may be positioned next to each other or may also be combined with a prism with dichroic mirrors (FIG. 7).

Figure 8:
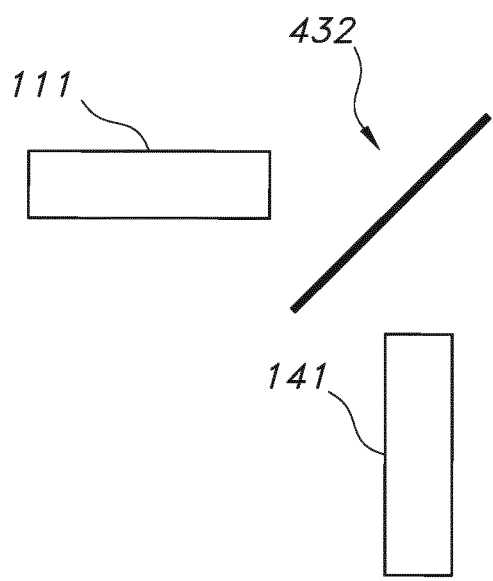

A polarizer may also be used to combine blue and UV light (FIG. 8). Such as solution is especially interesting if polarized light sources are used such as for example laser diodes.

Figure 9:
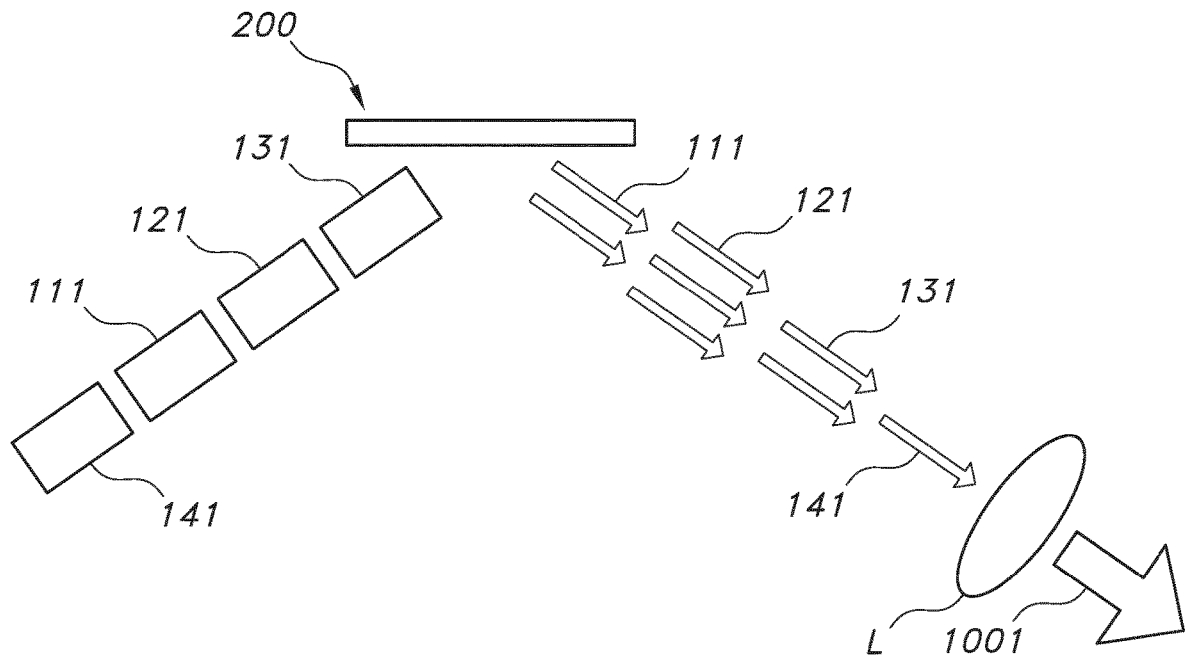

In an embodiment, we suggest that the spatial light modulator (SLM), having an array of switchable elements each for on-off light modulation, is illuminated by light of one color at a time emitted from the RGB and SWB/UV light sources, wherein the pattern of the switchable elements for on light modulation in the SWB/UV illumination step, correspond to the switchable elements which are all used for on light modulation in the R and G and B illumination steps (FIG. 9).

Figure 10:
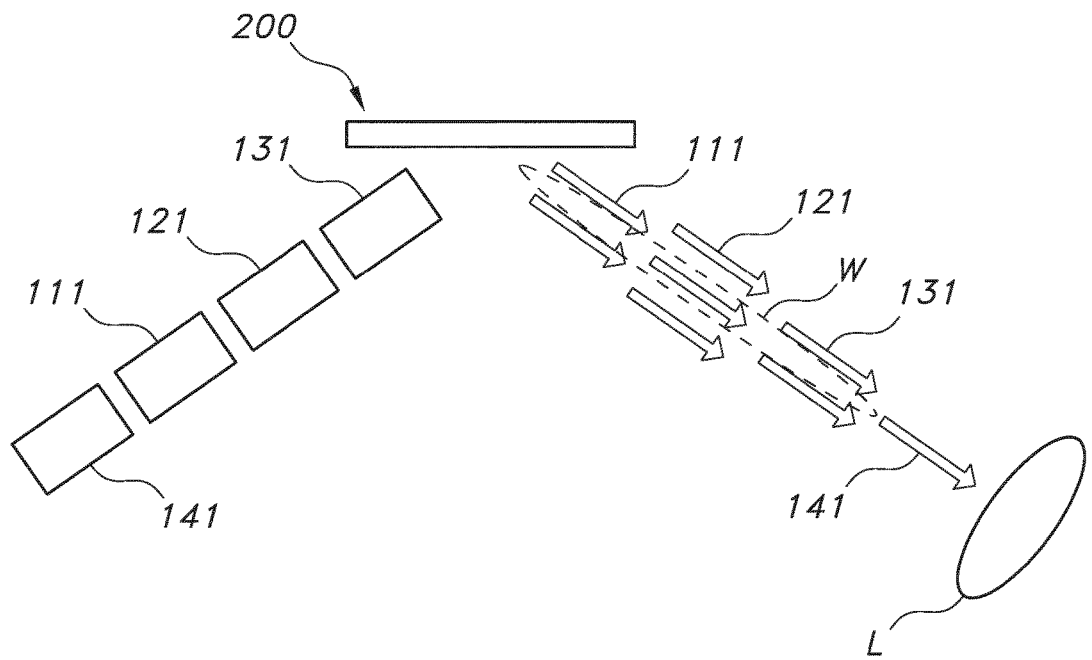

In another embodiment, we suggest that the spatial light modulator (SLM), having an array of switchable elements each for on-off light modulation, is illuminated by light of one color at a time emitted from the RGB and SWB/UV light sources, wherein the pattern of the switchable elements for on light modulation in the SWB/UV illumination step, correspond to the switchable elements which are all used for on light modulation in the R and G and B illumination steps wherein the RGB light is white light (FIG. 10). Reference W indicates white light.

This strategy has the additional advantage that the colored pixels of the projected image do not contain SWB or UV light. Only the 'white pixels' of the projected image have SWB and/or UV light. In this way, pixelated crispy white light is obtained and the SLM is exposed to a lower SWB and/or UV intensity which reduces degradation/failure of the SLM. The white light is light which is on or close to the black body line (BBL). Especially, the white light has a color point which is within 15 SDCM of the BBL. More especially, the white light has a color point which is within 10 SDCM of the BBL. Most preferably, the white light has a color point which is within 8 SDCM of the BBL. In another embodiment, only SWB and/or UV light is projected if the white light which has a color temperature in the range from 3000 K to 10.000 K. More especially, only SWB and/or UV light is projected if the white light has a color temperature in the range from 3500 K to 8000 K. Most especially, only SWB and/or UV light is projected if the white light has a color temperature in the range from 3700 K to 6500 K.

Figure 11:
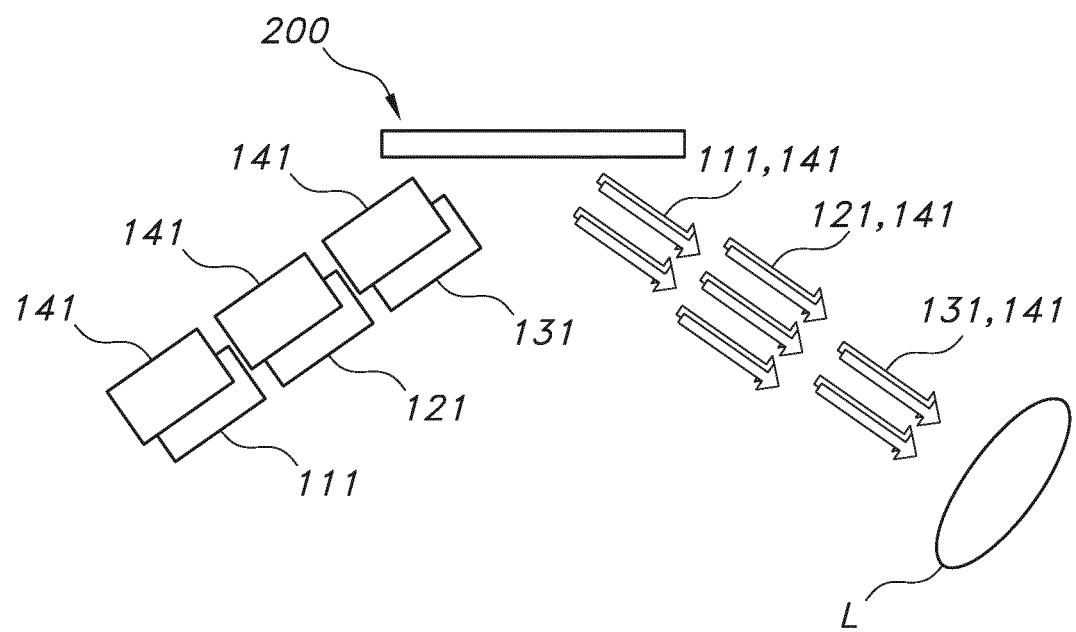

In another embodiment we suggest that the SLM is illuminated by light of one color at a time emitted from the RGB light sources, wherein the switchable elements for on light modulation in the R, G and B illumination steps are simultaneously illuminated with SWB/UV light (FIG. 11).

This strategy has the additional advantage that the white pixels in the projected image have a higher intensity of SWB and/or UV light and the SLM is exposed to a lower SWB and/or UV intensity which reduces degradation/failure of the SLM. For 3LCD one may use the blue light and UV light of the blue-UV channel sequentially and addressing the LCD of the blue-UV channel accordingly i.e. blue light+blue pixels LCD AND UV light+white pixels LCD.

Depending on the white portions of an image SWB and/or UV light is projected. This analysis can be performed by analyzing the emitted RGB colors and the addressing of the SLM.

Figure 12:
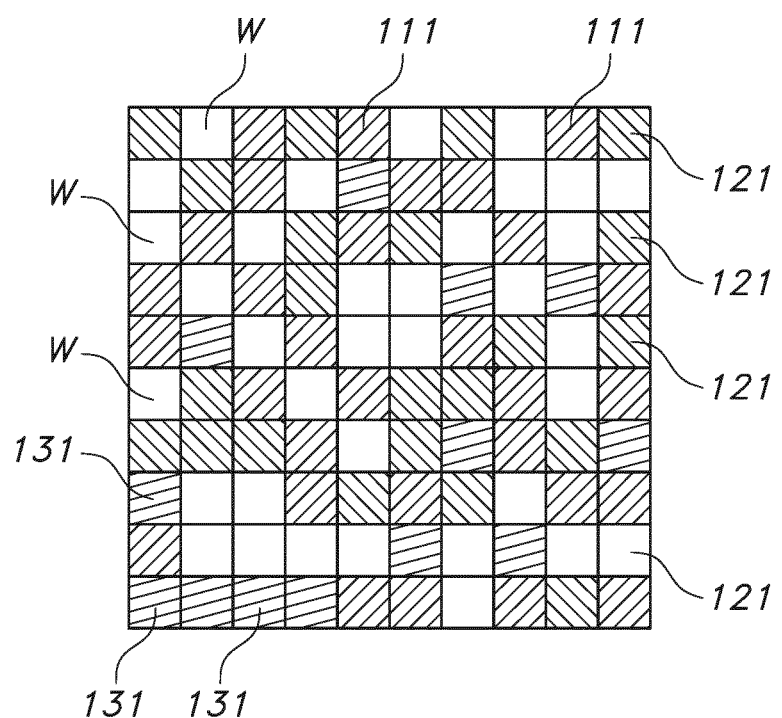

One may analyze the amount of white portions with respect to the amount of non-white portions (FIG. 12). Above a certain threshold SWB and/or UV light is projected. Reference W indicates again white light; references 111, 121, 131 may especially refers to blue, green and red light, and reference 141 refers to short wavelength blue and/or UV light.

Especially, in case more than 30% of the pixels are white SWB and/or UV light is projected. More especially, in case more than 35% of the pixels are white SWB and/or UV light is projected. Most especially, in case more than 40% of the pixels are white SWB and/or UV light is projected.

Figure 13:
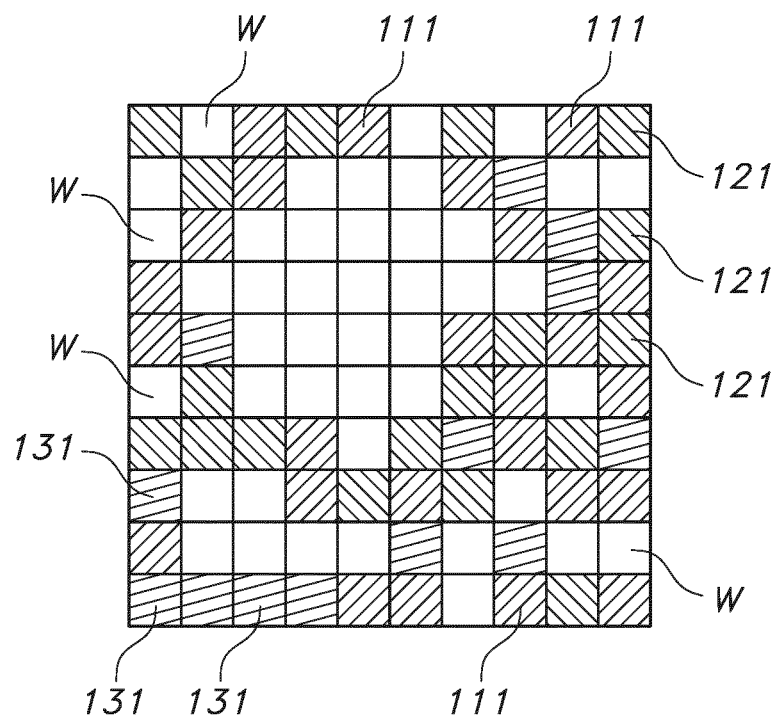

One also may analyze the size of a white area (FIG. 13). In case the white area is equal to or larger than a certain size SWB and/or UV light is projected.

Figure 14:
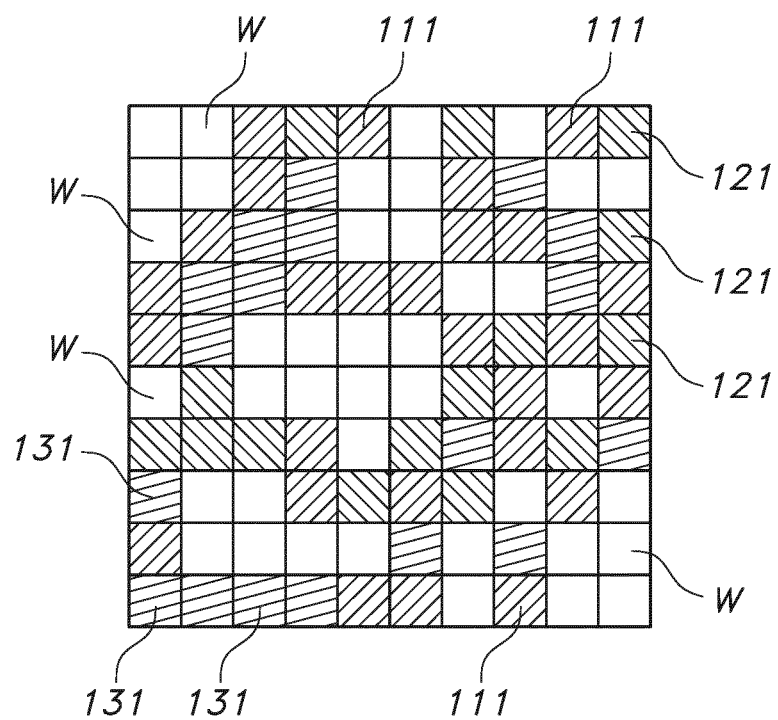

Especially, in case the size of a white area is more than 20% of the pixels SWB and/or UV light is projected. More especially, in case the size of a white area is more than 25% of the pixels SWB and/or UV light is projected. Most especially, in case the size of a white area is more than 30% of the pixels SWB and/or UV light is projected. One may also analyze the number of white areas (FIG. 14). In case many white areas are present SWB and/or UV light is projected.

Especially, in case of more than 5 areas having a size of a white area of 4% of the pixels SWB and/or UV light is projected. More especially, in case of more than 8 areas having a size of a white area of 4% of the pixels SWB and/or UV light is projected. Most especially, in case of more than 10 areas having a size of a white area of 4% of the pixels SWB and/or UV light is projected.

Figure 15:
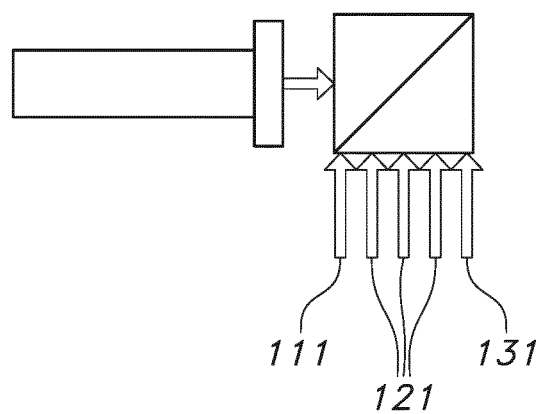

The UV light may also be provided in the optical path between the SLM and the exit of the projector (FIG. 15). The pixelated RGB light may be combined with UV light e.g. by a polarizer.

A lamp or luminaire may comprise the projection system.

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A full color projection system comprising:
   a lighting system configured to provide first light including blue light, second light including one or more of green and yellow light, third light including red light, wherein the first light, the second light, and the third light include light having a wavelength of 430 nm or larger;
   a further light source configured to provide further light source light including one or more of UV light and short wavelength blue light having a wavelength of 420 nm or smaller, wherein the first light, second light, third light and the further light source light have mutually differing spectral power distributions;
   a spatial light modulator system configured to receive the first light, the second light, the third light, and the further light source light, wherein the spatial light modulator system is configured to provide a plurality of pixels for providing projection system light with one or more of the first light, the second light, and the third light to create an image, and in one or more control modes the further light source light; and
   a control system configured to control the lighting system, the further light source, and the spatial light modulator system;
   wherein during operation one or more pixels are temporarily configured to provide white projection system light, and wherein the projection system is configured to provide also the further light source light only via one or more of those one or more pixels.

2. The projection system according to claim 1, wherein the further light source is configured to provide further light source light having a wavelength of 400 nm or smaller.

3. The projection system according to claim 1, wherein the projection system is configured to simultaneously provide the first light and the further light source light.

4. The projection system according to claim 1, wherein during operation one or more pixels are temporarily configured to provide one or more of the first light, the second light, the third light, the projection system is configured to provide also the further light source light via one or more of those one or more pixels.

5. The projection system according to claim 4, wherein the projection system is configured to provide also the further light source light via one or more of those one or more pixels only when during operation a predefined minimum number of pixels are temporarily configured to provide the white projection system light.

6. The projection system according to claim 4, wherein the projection system is configured to provide also the further light source light via one or more of those one or more pixels only when during operation a predefined minimum number of pixels in a cluster of neighboring pixels are temporarily configured to provide the white projection system light.

7. The projection system according to claim 4, wherein the projection system is configured to provide also the further light source light via one or more of those one or more pixels only when during operation the one or more pixels are temporarily configured to provide the white projection system light having a correlated color temperature of at least 3000 K.

8. The projection system according to claim 1, wherein the projection system is configured to provide the further light source light simultaneously with at least one of the first light, the second light, and the third light, or wherein the projection system is configured to sequentially provide the first light, the second light, the third light, and the further light source light, to the spatial light modulator system.

9. The projection system according to claim 1, wherein the lighting system comprises a first light source configured to provide first light including blue light, a second light source configured to provide second light including one or more of green and yellow light, a third light source configured to provide third light including red light, wherein the first light source, the second light source, the third light source, and the further light source are solid-state light sources.

10. The projection system according to claim 1, wherein the spatial light modulator system is multi micro-mirrors based.

11. The projection system according to claim 1, wherein the spatial light modulator system is multi-LCD based.

12. Use of projection system according to claim 1 for displaying a full-color image.

13. Use of projection system according to claim 1 for general lighting, especially for providing white projection system light having a color rendering index of at least 75.

14. A full color projection system comprising:
   a lighting system configured to provide first light including blue light, second light including one or more of green and yellow light, third light including red light, wherein the first light, the second light, and the third light include light having a wavelength of 430 nm or larger;
   a further light source configured to provide further light source light including one or more of UV light and short wavelength blue light having a wavelength of 420 nm or smaller, wherein the first light, second light, third light and the further light source light have mutually differing spectral power distributions;
   a spatial light modulator system configured to receive the first light, the second light, the third light, and the further light source light, wherein the spatial light modulator system is configured to provide a plurality of pixels for providing projection system light with one or more of the first light, the second light, and the third light to create an image, and in one or more control modes the further light source light; and
   a control system configured to control the lighting system, the further light source, and the spatial light modulator system;
   wherein during operation one or more pixels are temporarily configured to provide white projection system light, and wherein the projection system is configured to provide also the further light source light only via one or more of those one or more pixels;
   wherein the further light source is configured to provide further light source light having a wavelength in the range of 300-380 nm.

15. A method for projecting an image, the method comprising:
   providing one or more of first light including blue light, second light including one or more of green and yellow light, third light including red light, wherein the first light, the second light, and the third light include light having a wavelength of 430 nm or larger;
   using a projection system comprising a further light source configured to provide further light source light including one or more of UV light and short wavelength blue light having a wavelength of 420 nm or smaller, wherein the first light, second light, third light and the further light source light have mutually differing spectral power distributions;

irradiating with one or more of the first light, the second light, the third light, and the further light source light a spatial light modulator system comprised by the projection system, wherein the spatial light modulator system is configured to provide a plurality of pixels for providing projection system light with one or more of the first light, the second light, and the third light, and in one or more control modes the further light source light, wherein during operation one or more pixels are temporarily configured to provide white projection system light, and wherein the projection system is configured to provide also the further light source light only via one or more of those one or more pixels.

* * * * *